United States Patent
Bennett et al.

(10) Patent No.: US 10,637,585 B1
(45) Date of Patent: Apr. 28, 2020

(54) SECURE OPTICAL COMMUNICATION AND TARGET DESIGNATION USING FREQUENCY TUNING, HOPPING, AND ENCODING

(71) Applicant: BAE SYSTEMS Information and Electronic Systems Integration Inc., Nashua, NH (US)

(72) Inventors: Aaron W. Bennett, Merrimack, NH (US); Brant M. Kaylor, Merrimack, NH (US)

(73) Assignee: BAE Systems Information and Electronic Systems Integration, Nashua, NH (US)

( * ) Notice: Subject to any disclaimer, the term of this patent is extended or adjusted under 35 U.S.C. 154(b) by 0 days.

(21) Appl. No.: 16/352,935

(22) Filed: Mar. 14, 2019

(51) Int. Cl.
| H04B 10/85 | (2013.01) |
| H04B 10/07 | (2013.01) |
| H04B 10/548 | (2013.01) |
| H04B 10/112 | (2013.01) |

(52) U.S. Cl.
CPC ......... *H04B 10/85* (2013.01); *H04B 10/0705* (2013.01); *H04B 10/548* (2013.01); *H04B 10/1129* (2013.01)

(58) Field of Classification Search
CPC .. H04B 10/85; H04B 10/548; H04B 10/0705; H04B 10/11–118
See application file for complete search history.

(56) References Cited

U.S. PATENT DOCUMENTS

| 4,099,137 | A | 7/1978 | Alm, Jr. et al. |
| 5,443,227 | A | 8/1995 | Hsu |
| 5,686,722 | A | 11/1997 | Dubois et al. |
| 5,808,767 | A | 9/1998 | Williams et al. |
| 6,014,237 | A | 1/2000 | Abeles et al. |
| 6,025,795 | A | 2/2000 | Hulderman et al. |
| 6,271,946 | B1 | 8/2001 | Chang et al. |
| 6,760,549 | B2 | 7/2004 | Chang et al. |
| 6,987,784 | B2 | 1/2006 | Woodley et al. |
| 7,209,664 | B1 | 4/2007 | McNicol et al. |
| 2010/0196015 | A1* | 8/2010 | Gutin ............... H04B 10/2503 398/141 |
| 2013/0003038 | A1* | 1/2013 | Tachizaki ............ G01S 17/36 356/3.1 |
| 2017/0117970 | A1* | 4/2017 | Wilkinson ............ H04B 10/70 |

* cited by examiner

*Primary Examiner* — Casey L Kretzer
(74) *Attorney, Agent, or Firm* — Davis & Bujold, PLLC; Scott J. Asmus

(57) ABSTRACT

The system and method for secure optical communication, laser communication, and target designation. The system locks lasers at an absolute frequency reference and uses frequency tuning, frequency hopping, and frequency encoding techniques for optical communications. The system encodes information in the frequency context. An optional notch filter is used on a receiver to reduce "blinding" or saturation by adversaries. The system hops frequencies around an atomic reference. In some cases the system uses a frequency comb and a comb line of the second.

12 Claims, 4 Drawing Sheets

US 10,637,585 B1

SECURE OPTICAL COMMUNICATION AND TARGET DESIGNATION USING FREQUENCY TUNING, HOPPING, AND ENCODING

FIELD OF THE DISCLOSURE

The present disclosure relates to secure optical communication and target designation and more particularly to locking lasers at an absolute frequency reference and using frequency tuning, frequency hopping, and frequency encoding techniques for optical communications.

BACKGROUND OF THE DISCLOSURE

Laser-based optical communication systems offer high bandwidth communication through either free-space or optical fiber mediums or channels. Many of these systems encode information using intensity modulation (e.g. on/off keying). One potential weakness of these systems is that an eavesdropper with access to the communication channel is able to receive the same information flow as the intended receiver. While the eavesdropper may not be able to decrypt the message, the fact that the eavesdropper has access to the same information as the intended receiver presents a security concern.

In some cases, there is an additional concern that the eavesdropper could intercept the message and send a different message to the intended receiver. This is known as "spoofing." Depending on the quality of the spoof message, it may be difficult for the intended receiver to distinguish between it and a real message. Another tactic the eavesdropper could use to impede the flow of information is saturating the receiver's detector by illuminating the detector with high intensity, in-band laser light. This is known as "blinding." The term "jamming" is a generic term that refers to techniques that impede information flow through spoofing, blinding, or some other means.

Other techniques or approaches that rely on optical channels to pass information between platforms have the same potential security and jamming concerns. Two such examples are LIDAR and laser target designation. In both of these instances, a system may be especially vulnerable to these weaknesses because these techniques inherently rely on the receiver detecting light that has reflected off an object. If the object has an in-band detector (which is especially possible in military applications) and the information is encoded using intensity modulation, then the detector at the object will receive the same encoded waveform as the intended receiver. This received information may be decrypted or used to spoof the intended receiver. For example, in the case of laser target designation, a modulated retroreflector may be used to change the laser waveform that the missile detector receives.

It is the object of the present disclosure to overcome the above-mentioned potential weaknesses associated with conventional laser-based optical communication systems by using a reference locked optical system that uses frequency tuning, hoping, and encoding techniques to both provide additional message security and protect the channel against jamming.

SUMMARY OF THE DISCLOSURE

One aspect of the present disclosure is a method of optical communication using a frequency locked system, comprising: providing a transmitter and a receiver, wherein the transmitter and the receiver have an optical frequency comb each having a comb line that is locked to the same absolute reference; providing a high precision oscillator to set a frequency spacing between a plurality of comb lines from the transmitter comb and the receiver comb; prior to exchanging information, the receiver and transmitter agree upon a comb line of the second, wherein the comb line of the second is the comb line that will be used to transmit information during a particular GPS defined second; when the particular GPS second begins, both the transmitter and the receiver isolate a respective comb line of the second line; encoding information on an isolated comb line, via the transmitter, via phase or frequency modulation; and transmitting encoded information to the receiver.

One embodiment of the method of optical communication using a frequency locked system is wherein the absolute reference is an atomic frequency line.

Another embodiment of the method of optical communication using a frequency locked system is wherein the high precision oscillator is an atomic clock or a crystal oscillator. In some cases, the encoded information is stored in frequency content of modulated light.

Yet another embodiment of the method of optical communication using a frequency locked system is wherein isolation comprises frequency selective amplification by stimulated Brillouin scattering coupled with a Brillouin dynamic grating. In certain cases, the transmitter uses an electro-optical (EO) modulator or an acousto-optic (AO) modulator to encode information.

Certain embodiments of the method of optical communication using a frequency locked system further comprise amplifying the modulated comb line using a fiber amplifier prior to transmitting to the receiver. Some embodiments of the method of optical communication using a frequency locked system further comprising on the receiver, providing a variable optical notch filter to allow light at the comb line of the second frequency to pass through and reflect other light. In some cases, the optical notch filter uses liquid crystal technology.

Yet another embodiment of the method of optical communication using a frequency locked system further comprises interfering on the receiver's detector the receiver's comb line of the second light and the transmitted light to form a beat note between these two signals which contains frequency information encoded on a transmitted beam. In still yet another embodiment of the method of optical communication using a frequency locked system according to claim 10, further comprising detecting the beat note at the receiver and the receiver communicating to the transmitter to reduce the intensity of the transmitted light, such that the receiver relies on gain from coherent mixing of the two frequency comb lines to pull low signal information from noise.

An embodiment of the method of optical communication using a frequency locked system is wherein once the GPS second is complete, both the transmitter and receiver change to a new comb line of the second and continue transmitting on that new comb line.

Another aspect of the present disclosure is a method of target designation using a frequency locked system, comprising: providing a target designator locked to an absolute frequency reference; providing a missile receiver locked to that same frequency reference; encoding a laser waveform sent via the target designator; encoding the frequency of the laser signal sent via the target designator by hoping frequencies near the absolute frequency reference, wherein the missile receiver hops frequency when the target designator hops frequency; and distinguishing, at the missile receiver, laser light from the target designator from other signals when the frequency hops are within an electronic bandwidth of the receiver.

One embodiment of the method of target designation using a frequency locked system further comprises on the receiver, providing a variable optical notch filter to allow light from the target designator to pass through and reflect other light. In some cases, encoding the frequency comprises hoping between pre-determined frequencies.

In certain embodiments of the method of target designation using a frequency locked system, the optical notch filter uses liquid crystal technology.

Yet another aspect of the present disclosure is a method for LIDAR communication using a frequency locked system, comprising: providing at least one receiver locked to an absolute frequency reference; providing a transmitting laser locked to a same absolute frequency reference, the transmitting laser being located some distance away from a first receiver of the at least two receivers and in some cases some distance away from at least one other receiver of the at least one receivers; encoding a laser waveform sent via the transmitter; encoding the frequency of the laser signal sent via the transmitter by hoping frequencies near the absolute frequency reference, wherein the at least one receiver hops frequency when the transmitter hops frequency; and distinguishing, at the at least two receivers, laser light from the transmitter from other signals when the frequency hops are within an electronic bandwidth of the at least one receiver.

One embodiment of the method for LIDAR communication using a frequency locked system further comprises on the at least one receiver, providing a variable optical notch filter to allow light from the target designator to pass through and reflect other light.

In some cases, encoding the frequency comprises hoping between pre-determined frequencies. In certain embodiment of the method for LIDAR communication using a frequency locked system, the optical notch filter uses liquid crystal technology.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Figure 1A:
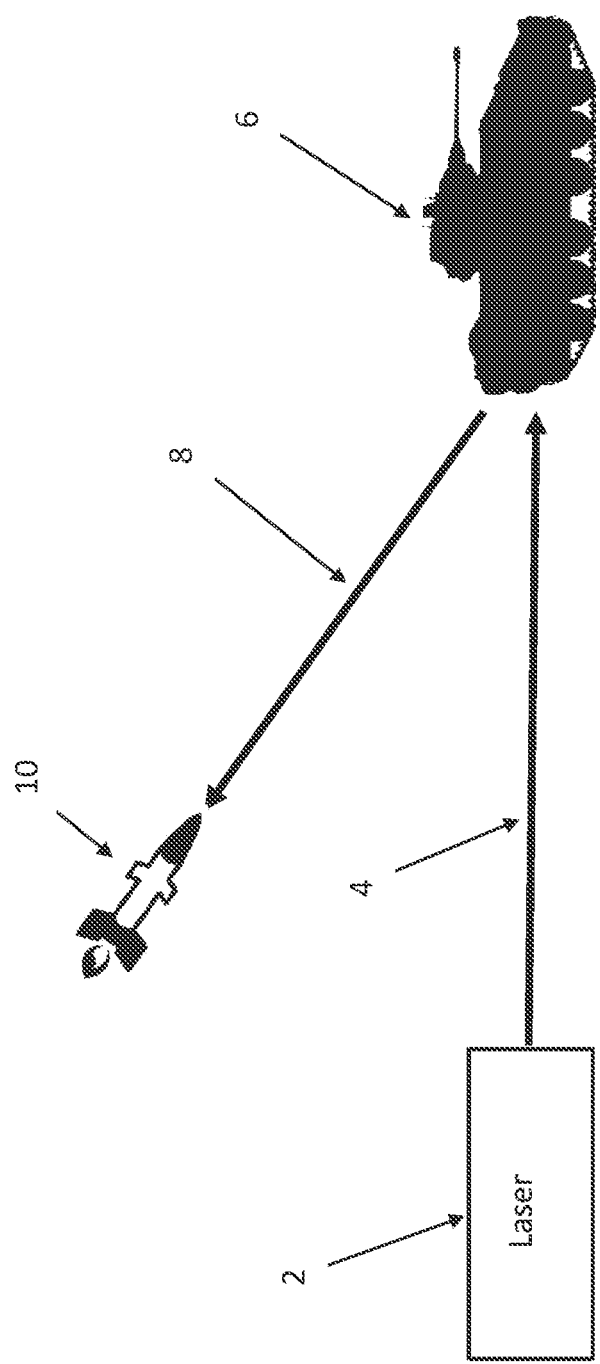
FIG. 1A is a diagrammatic view of one embodiment of the optical system of the present disclosure as used in target designation.

It is to be appreciated that optical communication systems are vulnerable. For example, most methods of encoding information (intensity modulation, polarization encryption, or even frequency encryption) are relatively easy for someone with physical access to the transmission line to discern. Also, the receiver's detector can be "blinded" or saturated by exposing it to high intensity, in-band laser light, preventing the flow of information. As noted previously, spoofing and jamming can also be an issue for optical communication and target designation applications.

The present approach of coherently communicating between two platforms with lasers locked to an absolute frequency reference LIDAR, target designation, and laser communication applications. In one embodiment of the present disclosure, both the transmitter and the receiver have an optical frequency comb. In this system, both frequency combs have a comb line that is locked to the same absolute reference (e.g. an atomic frequency line) and a high precision oscillator (e.g. an atomic clock) is used to set the frequency spacing between the plurality of comb lines.

In certain embodiments, prior to exchanging information the receiver and transmitter agree upon a comb line of the second. This comb line of the second is the comb line that will be used to transmit information during a particular GPS defined second. In one embodiment of the present disclosure, when the second begins, both the transmitter and the receiver isolate their comb line of the second line. In some cases, isolation comprises frequency selective amplification by stimulated Brillouin scattering coupled with a Brillouin dynamic grating. In one embodiment, the transmitter uses an electro-optical (EO) modulator or an acousto-optic (AO) modulator to encode information on the isolated comb line via phase or frequency modulation. In some cases, the encoded information is stored in the frequency content of the modulated light. The modulated comb line can then be amplified, perhaps using a fiber amplifier, and then transmitted to the receiver.

In certain embodiments, on the receiver end, a variable optical notch filter, perhaps using liquid crystal technology, allows the light at the comb line of the second frequency to pass through and reflects almost all other light (making it difficult to blind the receiver by saturating its detector). The receiver's comb line of the second light and the transmitted light interfere on the receiver's detector. The beat note between these two signals contains the frequency information encoded on the transmitted beam. Once the beat note is detected, the receiver has the option to tell the transmitter to reduce the intensity of the transmitted light. In some cases, the receiver relies on the gain from the coherent mixing of the two frequency comb lines to pull low signal information from the noise. Once the GPS second is complete, both the transmitter and receiver change to a new comb line of the second and continue transmitting on that new comb line.

According to the principles of the present disclosure, the encoded information sent by a transmitter can only be recovered by someone who has a narrow linewidth laser source with a frequency that is different than the frequency of the laser light from the transmitter by at most the electronic bandwidth of the detector system, which could be a maximum of tens of GHz of the transmitted line of the second. While someone may have one laser whose frequency is close to one of the comb lines, that comb line will only be used sporadically during data transfer. Even if someone has a frequency comb that covers the same range of wavelengths covered by the comb used by the transmitter and receiver (which is unlikely), the comb lines will likely not be centered on the same specific wavelengths as the comb lines of the transmitter and receiver.

In certain embodiments, the comb line of the second changes rapidly, perhaps more often than every second, making it difficult for someone with the ability to wavelength hop over a wide range to keep up. The variable notch filter in front of the receiver's detector is also important because it makes it difficult for someone to blind the receiver by saturating the receiver with high power laser light. In certain embodiments in a free space optical communication environment, the ability to turn down the intensity of the transmitted light decreases the probability of a threat intercepting the transmitted laser beam relying on the coherent detection gain. A similar approach could be used for coherent laser radar, e.g., mono-static and bi-static.

In certain embodiments of the system used in target designation, a target designator is locked to an absolute frequency reference like an atomic absorption line and a laser in the missile is locked to that same reference. Then, in addition to encoding the laser waveform, the frequency of the target designator laser is encoded by hoping the frequency between pre-determined frequencies near the absolute reference. In some cases on the missile, a narrow optical notch filter is placed in front of the missile detector so only laser light at precisely the frequency of the locked laser will make it to the missile's detector.

In certain embodiments, unwanted light is prevented from passing through the notch filter so that the laser light from the source on the missile that is locked to the reference is what the detector receives. This beat note will hop frequency when the target designator laser hops frequency. Provided the frequency hops are within the electronic bandwidth of the receiver, the missile should be able to distinguish laser light from the target designator and laser light from a threat platform that happens to be at the same frequency as the target designator light.

Referring to FIG. 1A, a diagrammatic view of one embodiment of the optical system of the present disclosure as used in target designation is shown. More specifically, a laser locked to an atomic frequency line 2 produces pulses 4 that are both waveform and frequency encoded. These pulses are reflected 8 off a target 6 and a missile 10 coherently detects laser light bouncing off enemy target. In one embodiment of the optical system, the missile's laser is locked to the same atomic reference line as the target designator 2. A narrow bandpass filter prevents light not at the atomic reference frequency from making it to the missile's detector. The missile is able to identify light from the target designator because it knows both the waveform and frequency encoding. The missile is immune to jamming by saturating the detector because the bandpass filter filters out light that is not within 10s of gigahertz of the atomic reference frequency.

This approach is largely immune to spoofing because the missile looks for both the waveform and the frequency encoding. While an enemy sensor may be able to decipher the waveform encoding and send a similarly encoded pulse to the missile, the enemy will not be able to decipher the frequency encoding unless it has a laser at exactly the same frequency as target designator laser.

Figure 1B:
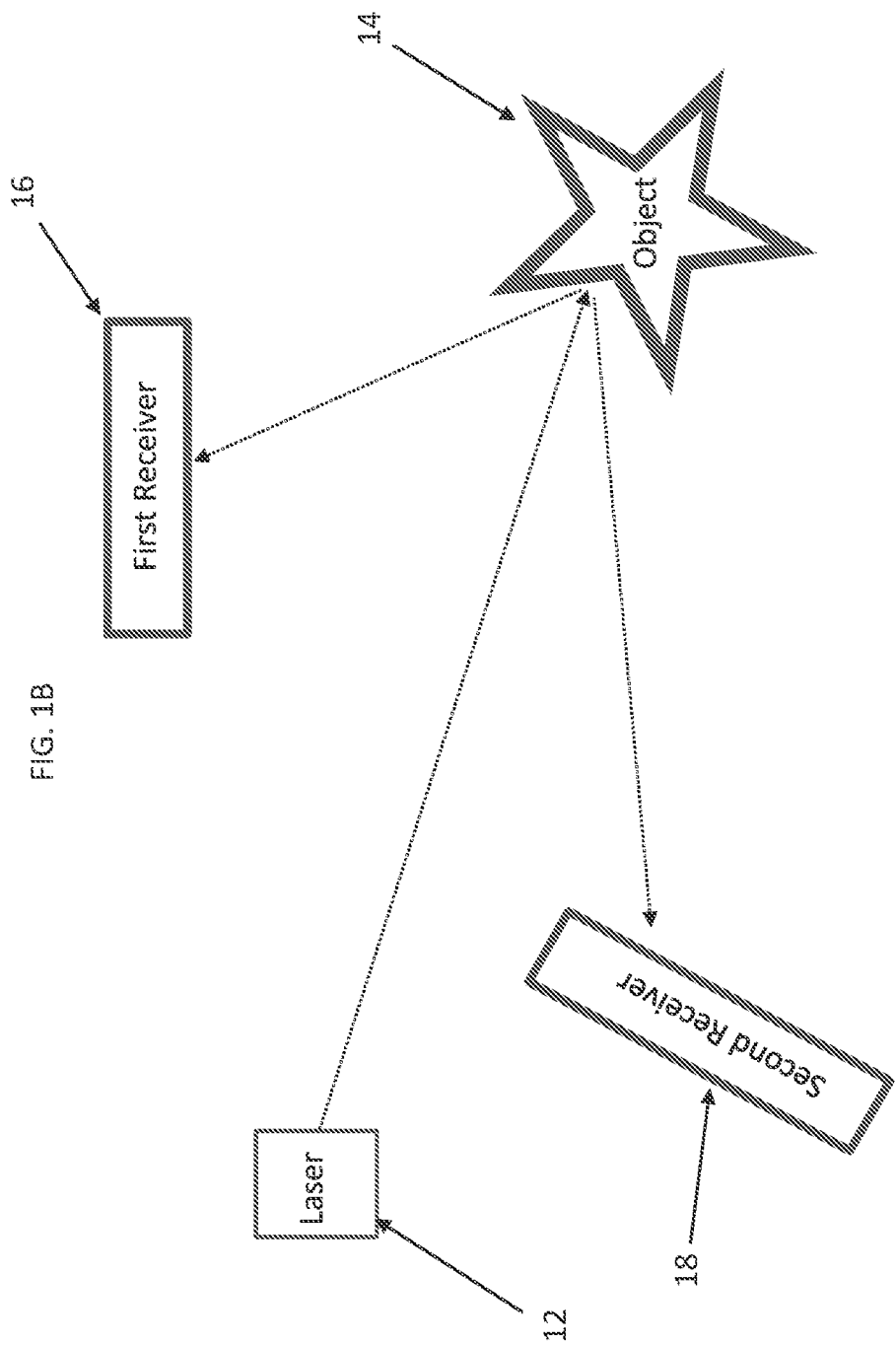
FIG. 1B is a diagrammatic view of another embodiment of the optical system of the present disclosure as used optical communications bounced off an object.

Referring to FIG. 1B, a diagrammatic view of another embodiment of the optical system of the present disclosure as used optical communications bounced off an object is shown. More specifically, in one embodiment of the present disclosure the narrow linewidth lasers on the transmitter and receiver platforms are locked to the same atomic absorption line. Because atomic absorption lines are an absolute reference, each of the lasers in the bistatic or multi-static system would be locked to the same frequency to within the linewidth of the frequency reference. Each laser may also be locked to an optical cavity for increased frequency stability. In simple terms, the transmission through an optical cavity is frequency dependent, thus providing a measurable signal to be stabilized.

Referring to FIG. 1B, a diagrammatic view of a multi-static LIDAR system according to the principles of the present disclosure is shown. More specifically, in a multi-static system, a transmitting laser 12 is located some distance away from a first receiver 16 for the system, and some distance away from at least one other receiver 18 for the system. The multi-static system is used to sense at least one object 14. In some cases, the transmitter 12 is located outside of firing range of a target (e.g., the transmitter is located on an aircraft), while the one or more receivers are within firing range of the target (e.g., one of the receivers is located on a tank). In some cases, there could just be one receiver that's located remotely from the transmitter (i.e., in a bi-static case).

Still referring to FIG. 1B, in some cases the laser transmits at about 1560 nm. In certain embodiments, each platform (i.e., transmitting and receiving) has lasers that are doubled and locked to a 780 nm Rb transmission. In this embodiment, this wavelength band between 1530 nm and 1570 nm is used because both high performance lasers and detectors are readily available. Other commonly used wavelength bands could be between 850 nm to 900 nm, 1030 nm to 1064 nm and 515 nm to 532 nm, for the same reasons. Wavelength bands that are commonly avoided are those with very poor atmospheric transmission such as 1350 nm to 1500 nm, 1800 nm to 1950 nm, 2500 nm to 3000 nm and 5000 nm to 8000 nm, with the caveat that wavelength bands of moderate transmission can be beneficial for LIDAR gas and chemical sensing applications.

Figure 2:
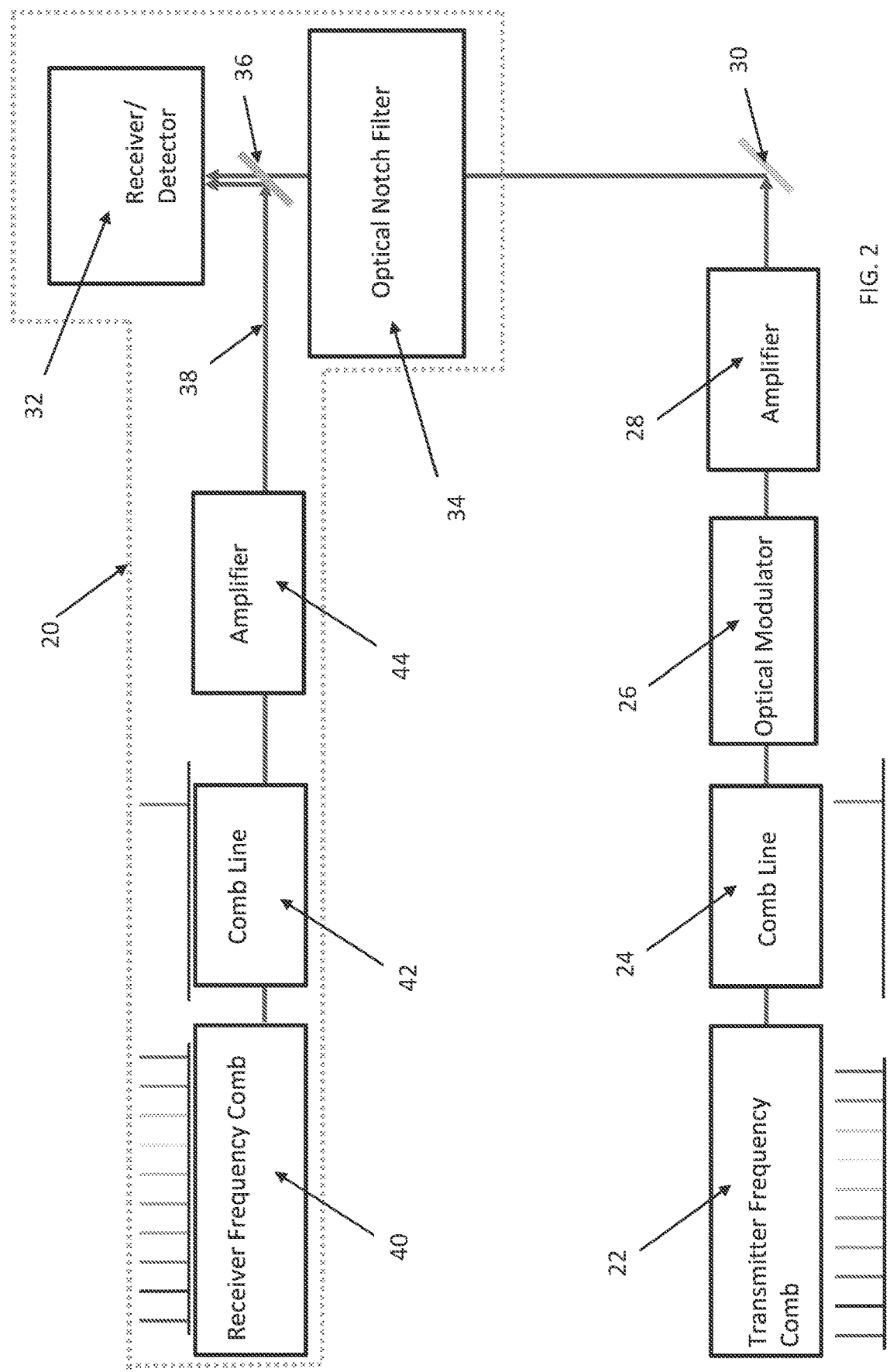
FIG. 2 is a diagram of another embodiment of the optical system of the present disclosure as used in optical communications.

FIG. 2 is a diagram of an embodiment of the optical system of the present disclosure as used in optical communications, where the laser light is sent directly from the transmitter to the receiver. A similar system could be used for both LIDAR and target designation applications (See, e.g., FIG. 1B and FIG. 1A, respectively). In these applications, the transmitter would instead direct the laser light at an object and the receiver would detect light reflecting off the object.

Referring to FIG. 2, a diagram of an embodiment of the optical system of the present disclosure as used in optical communications is shown. More specifically, the system provides secure optical communication using wavelength agile frequency encoding. In one embodiment, a coherent receiver 20 is used. A transmitter comprising a transmitter frequency comb 22 is also used. A comb line is selected 24 from the transmitter frequency comb and an optical modulator 26 is used to imprint frequency information on the selected comb line. In certain embodiments, an amplifier 28 is used to boost the encoded signal. In some cases, optical elements such as a mirror 30 are used to further guide the laser light. The transmitted information is frequency encoded.

Still referring to FIG. 2, a receiver/detector 32 receives the encoded signals sent by the transmitter. In some cases, a variable wavelength optical notch filter 34 is used to filter the incoming light. In certain embodiments, the filter is a liquid crystal filter. A beam splitter 36 is used to direct the light coming via from the optical notch filter 34 and the coherent receiver pathway 38. In certain embodiments, the coherent receiver comprises a receiver frequency comb 40. A receiver comb line 42 is matched to the transmitter comb line 24. Both the transmitter and the receiver comb lines are periodically hopped, changing the transmitted wavelength by up to tens of nanometers. In some cases, an amplifier 44 may be used in the coherent receiver.

It is to be understood that FIG. 2 illustrates a direct optical communications approach (transmitter to receiver), but the same transmitter and receiver architecture could be used for LIDAR and target designation, where the beam is reflected off an object before being received by a detector.

Figure 3:
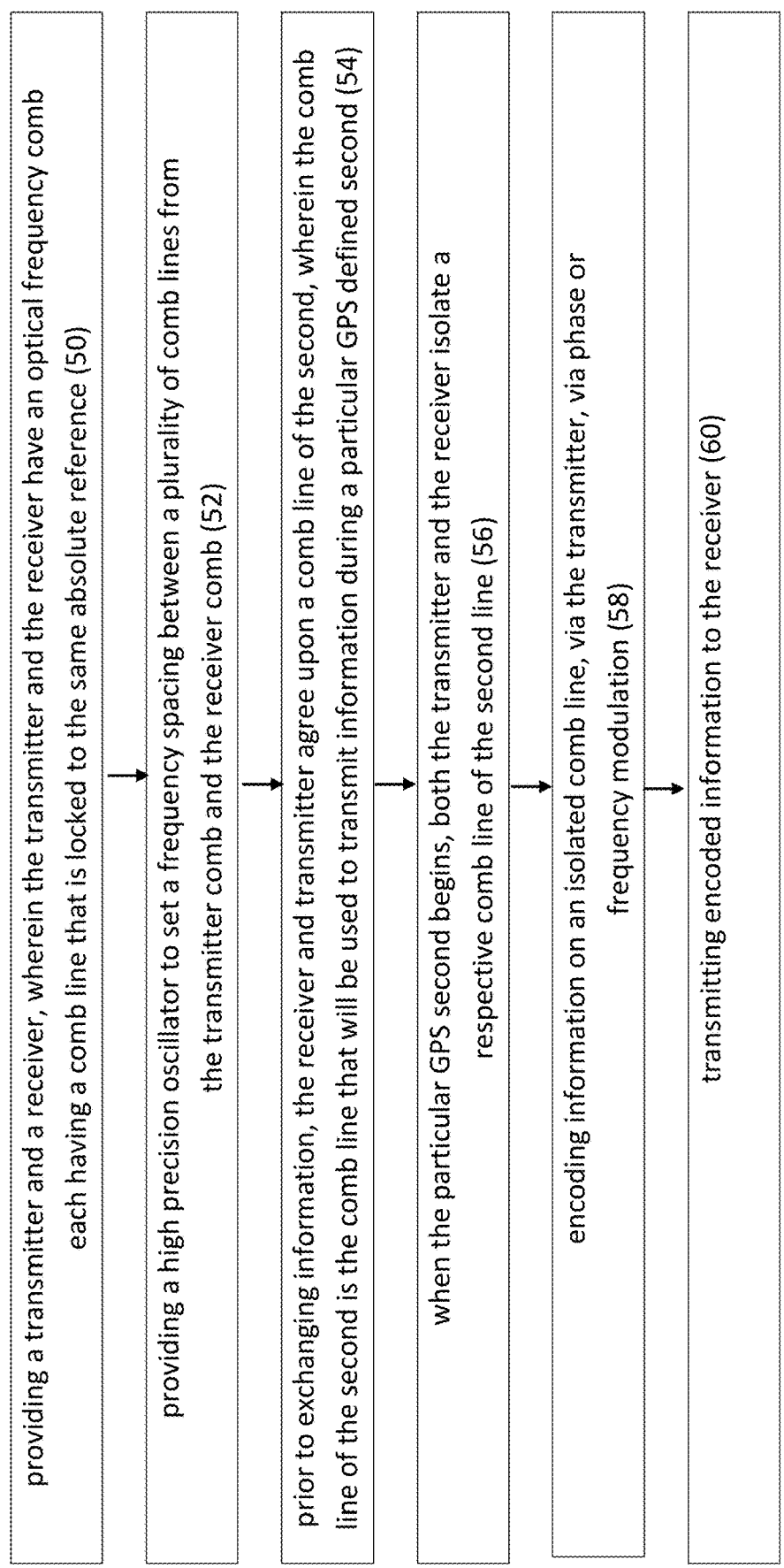
FIG. 3 is a flowchart of one embodiment of a method of the present disclosure.

Referring to FIG. 3, a flowchart of one embodiment of a method of the present disclosure is shown. More specifically, one embodiment of a method of optical communication using a frequency locked system comprises providing a transmitter and a receiver, wherein the transmitter and the receiver have an optical frequency comb each having a comb line that is locked to the same absolute reference 50. In some cases, a high precision oscillator is provided to set frequency spacing between a plurality of comb lines from the transmitter comb and the receiver comb 52. Prior to exchanging information, the receiver and transmitter agree upon a comb line of the second, wherein the comb line of the second is the comb line that will be used to transmit information during a particular GPS defined second 54. When the particular GPS second begins, both the transmitter and the receiver isolate a respective comb line of the second line 56. In certain embodiments, information is encoded on an isolated comb line, via the transmitter, via phase or frequency modulation 58; and the encoded information is transmitted to the receiver 60.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A method of optical communication using a frequency locked system, comprising:

providing a transmitter and a receiver, wherein the transmitter and the receiver have an optical frequency comb each having a comb line that is locked to a same absolute reference;

providing a high precision oscillator to set a frequency spacing between a plurality of comb lines from the transmitter comb and the receiver comb;

prior to exchanging information, the receiver and the transmitter agreeing upon a particular comb line, wherein the particular comb line is a comb line that will be used to transmit information during a particular Global Positioning Satellite (GPS) defined second;

when the particular GPS defined second begins, both the transmitter and the receiver isolating their respective particular comb lines;

encoding information on the transmitter particular comb line, via the transmitter, via phase or frequency modulation; and transmitting the encoded information to the receiver.

2. The method of optical communication using a frequency locked system according to claim 1, wherein the absolute reference is an atomic frequency line.

3. The method of optical communication using a frequency locked system according to claim 1, wherein the high precision oscillator is an atomic clock or a crystal oscillator.

4. The method of optical communication using a frequency locked system according to claim 1, wherein the encoded information is stored in frequency content of modulated light.

5. The method of optical communication using a frequency locked system according to claim 1, wherein the isolating the respective particular comb lines comprises frequency selective amplification by stimulated Brillouin scattering coupled with a Brillouin dynamic grating.

6. The method of optical communication using a frequency locked system according to claim 1, wherein the transmitter uses an electro-optical (EO) modulator or an acousto-optic (AO) modulator to encode information.

7. The method of optical communication using a frequency locked system according to claim 1, further comprising amplifying the modulated comb line using a fiber amplifier prior to transmitting to the receiver.

8. The method of optical communication using a frequency locked system according to claim 1, further comprising, providing a variable optical notch filter on the receiver to allow light at the particular comb line to pass through and reflect other light.

9. The method of optical communication using a frequency locked system according to claim 8, wherein the variable optical notch filter uses liquid crystal technology.

10. The method of optical communication using a frequency locked system according to claim 1, further comprising interfering on a receiver detector the receiver particular comb line and the transmitted light to form a beat note which contains frequency information encoded on a transmitted beam.

11. The method of optical communication using a frequency locked system according to claim 10, further comprising detecting the beat note at the receiver and the receiver communicating to the transmitter to reduce intensity of the transmitted light, such that the receiver relies on gain from coherent mixing of the particular frequency comb lines to pull low signal information from noise.

12. The method of optical communication using a frequency locked system according to claim 1, wherein once the particular GPS defined second is complete, both the transmitter and receiver change to a new comb line and continue communication on the new comb line.

* * * * *